United States Patent [19]

Seeney et al.

[11] 4,311,619

[45] Jan. 19, 1982

[54] COLD SET PHENOL-FORMALDEHYDE RESIN

[75] Inventors: Charles E. Seeney, Brazil; John F. Kraemer; Larry J. Hoffman, both of Terre Haute, all of Ind.

[73] Assignee: Aristo Corporation, Detroit, Mich.

[21] Appl. No.: 139,304

[22] Filed: Apr. 14, 1980

[51] Int. Cl.$^3$ .................................................. C08G 8/10
[52] U.S. Cl. ........................................ 260/7; 525/480;
 525/508; 528/139; 528/140; 528/159; 528/163;
 528/164; 528/165
[58] Field of Search ..................... 260/7, 139, 140;
 528/164, 165, 159, 163; 525/508, 480

[56] References Cited

U.S. PATENT DOCUMENTS

| | | | |
|---|---|---|---|
| 3,274,139 | 9/1966 | Lambuth | 260/29.3 |
| 3,299,167 | 1/1967 | Knowlson et al. | 260/19 N X |
| 3,312,650 | 4/1967 | Case et al. | 528/129 X |
| 3,485,797 | 12/1969 | Robins | 528/139 X |
| 4,022,942 | 5/1977 | Anderson et al. | 260/29.3 |
| 4,048,125 | 9/1977 | Ingram | 260/7 |
| 4,060,504 | 11/1977 | Higginbottom | 528/140 X |
| 4,083,817 | 4/1978 | Anderson | 528/159 X |
| 4,120,847 | 10/1978 | Culbertson | 528/140 |
| 4,140,845 | 2/1979 | Vasishth | 528/139 |
| 4,157,324 | 6/1979 | Culbertson | 528/140 X |

OTHER PUBLICATIONS

Chem-Abstracts, vol. 52, 1958, 7763i–77764a–c, Fraser et al.
Journal of Polymer Science–Polymer Letters Edition, vol. 17, 489–492 (1979), Pizzi.

*Primary Examiner*—Howard E. Schain
*Attorney, Agent, or Firm*—Cook, Wetzel & Egan, Ltd.

[57] ABSTRACT

A phenol-aldehyde resin useful in such applications as a cold-set binder for cores and molds used in the foundry industry and reactive prepolymers used in reaction injection molding compositions produced by the steps of reacting a phenol and aldehyde in a mole ratio of 1 to 1–2.3 in the presence of catalytic amounts of an organic compound of aluminum, zirconium or titanium.

23 Claims, No Drawings

COLD SET PHENOL-FORMALDEHYDE RESIN

BACKGROUND OF THE INVENTION

This invention relates to a phenol-aldehyde resin.

In a particular aspect this invention relates to a resin useful as a cold-set binder for cores and molds used in the foundry industry.

It is known from J. Robins, U.S. Pat. Nos. 3,676,392; 3,409,579; and 3,485,797 to provide rapid curing binders for foundry aggregates. The binders are phenol-aldehyde resins which are reactive with isocyanates or prepolymers or polyurethanes. According to Robins, the foundry aggregate is mixed with the resin to which has been added a weak amine curing agent. This mixture is mixed with the isocyanate or polyurethane, then placed in a molding box or core box and after a short curing time, the mold or core is firm enough to be removed. This process makes possible a high production rate from a limited number of molds or core boxes, which are often very expensive and difficult to make.

In U.S. Pat. No. 3,485,797, Robins discloses a resin made by reacting an aldehyde with a phenol at a mole ratio greater than 1 in the presence of a catalyst selected from organic carboxylic salts of lead, zinc, stannous tin, iron, lithium, manganese, cobalt, copper and calcium. Of these salts, lead and zinc produced a resin containing between 5 and 10% of free formaldehyde (based on the original) whereas the remaining (except for tin for which no data are disclosed) produced a resin containing from 11 to 34% of the original formaldehyde in unreacted form. These resins are described as being a mixture of dimethylol compounds having dimethylene ether linkages and methylene linkages, the former being predominant. During the reaction, water is removed continuously as an azeotrope with, e.g. aliphatic, aromatic and halogenated hydrocarbons, ethers, esters and ketones. These resins can be cross-linked by heating or by the addition of acidic compounds such as $BF_3$, $ZnCl_2$, $SnCl_4$ or hydrogen acids such as sulfuric and sulfonic acids.

These binders have been very successful, but there have been some problems associated with them. The principal problems involve poor solubility of the resins in organic solvents and the lead catalyst, which is generally preferred for preparing them, remains in the resin where it forms a toxic residue, thus becoming an industrial hygiene problem.

SUMMARY OF THE INVENTION

It is an object of this invention to provide an improved phenol-aldehyde resin.

It is another object of this invention to provide a reactive phenol-aldehyde prepolymer having improved solubility characteristics.

It is a third object of this invention to provide a reactive phenol-aldehyde prepolymer free from lead residues.

It is a fourth object of this invention to provide an improved cold set resin useful as a binder for foundry aggregate for preparing cores and molds for the foundry industry.

It is a fifth object of this invention to provide phenol-aldehyde resins useful as adhesives and thermosetting plastics.

Other objects will be apparent to those skilled in the art from the description herein.

It is the discovery of this invention to provide a phenolaldehyde resin produced by the steps of reacting a phenol with an aldehyde in a mole ratio of 1 to 1–2.3 in the presence of catalytic amounts of an organic derivative of aluminum, zirconium or titanium.

The resin so obtained is a prepolymer useful as a cold-set binder for foundry aggregate for preparing cores and molds and can be used singly or in multi-component binder systems, including those which can be cured chemically, thermally, or by radiation techniques. The resin is soluble in polar organic solvents and in polar-nonpolar solvent mixtures. Other uses will also be apparent to those skilled in the art, e.g. as an adhesive.

DETAILED DISCUSSION

According to the process of the present invention, a phenol and an aldehyde, preferably unsubstituted phenol and formaldehyde, are reacted in the presence of the catalyst in a mole ratio of about 1 to 1–2.3, preferably about 1 to 1.3, at a temperature of from about 100° C. to 130° C. for a period of time sufficient to result in a cloud point of from 40 to 60% (cloud point determinations are known in the art; a 1% solution of the resin in tetrahydrofuran is prepared and is titrated with water until a cloud appears; the percentage of water tolerated is reported as the cloud point), and a neat viscosity of 100–2000 cps at 75° C. At the end of the heating period, residual aldehyde is present in an amount of 1–9%, preferably about 3%, and free phenol is present in an amount of 4–10%, preferably about 8%. The water content is approximately 1%. During the reaction period, water of reaction plus the conjugate alcohol of the aldehyde, and solvent, if any, are separated by distillation. After the reaction is judged to be complete as determined by cloud point and viscosity measurements, the temperature is reduced to about 75° C. and a vacuum is applied to remove residual water and alcohol or solvent. The resin is then further cooled and diluted with a suitable solvent or solvent mixture such as butoxyethanol, alone or with aromatic solvents, to any desired concentration, usually to about 60% for use in a no-bake process or to about 50% for use in a cold box.

More particularly, it is an embodiment of this invention to provide a 2-stage process for the production of a resin prepolymer comprising the steps of reacting phenol and formaldehyde in a mole ratio of about 1 to 1–2.3 at a temperature of up to about 120° C., for a period of time sufficient to provide a cloud point of 50–60% thereby forming water of reaction and methanol, then separating a major portion of the water of reaction and methanol by distillation at 115°–120° C. for a period of time sufficient to provide a cloud point of 47–50% and a viscosity of 100–130 centipoise at 75° C. and separating residual water and methanol at reduced pressure at about 80° C. or less thereby producing a prepolymer having a cloud point of about 45–50% and a neat viscosity of 200–1000 centipoise at 75° C.

The phenol-aldehyde resin prepolymer so produced is essentially an ortho-substituted, aldehyde-terminated, oligomer having an average degree of polymerization of between 2 and 15 phenol units. The resin prepolymer is further characterized in that the phenol units are connected by benzylic ether and methylene bridges which are present in a ratio of about 1:5.

Acetal and aldehydic terminated polymers are present along with the usual methylol groups. This provides the observed improved properties, such as solubility, of this resin system.

The distillate obtained during the condensation reaction of the phenol and aldehyde contains water of reaction, residual reactants and, surprisingly, the conjugate alcohol of the aldehyde reactant. For example, when the reactants are phenol and formaldehyde in a 1.3 mole ratio, there will be about 10% of methanol in the distillate.

The presence of the conjugate alcohol in the distillate is a characterizing feature of the phenol-aldehyde reactions catalyzed by alkoxides and carboxylates of aluminum, zirconium and titanium. Another characterizing feature of this reaction is the presence of salicylaldehyde as a component of the resin.

It is also a characterizing feature of these phenol-aldehyde reactions that the reaction mixture is unusually acidic. For example, the pH of a 1:1 by volume slurry in water is about 2.5 or less, depending on catalyst type and concentration.

The phenol used in the practice of this invention generally will be the unsubstituted compound. However, substituted phenols are regarded as the practical equivalent thereof and can be substituted in place of phenol. Since the resins tend to be principally ortho-substituted on the phenol ring, ortho-substituted phenols are generally considered to be undesirable. However, any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols which can be employed in the formation of the phenolic resins include: alkyl-substituted phenols, aryl-substituted phenols, cycloalkyl-substituted phenols, the foregoing substituents containing from 1 to 26 and preferably from 1 to 6 carbon atoms. Specific examples of suitable phenols, aside from the preferred unsubstituted phenol include: m-cresol, p-cresol, 3,5-xylenol, 2,3,4-trimethylphenol, 3-ethylphenol, 3,5-diethylphenol, p-butylphenol, 3,5-dibutylphenol, p-amylphenol, p-cyclohexylphenol, p-octylphenol, 3,5-dicyclohexylphenol, p-phenylphenol, p-crotylphenol, 3,5-dimethoxyphenol, 3,4,5-trimethoxyphenol, p-ethoxyphenol, p-butoxyphenol, 3-methyl-4-methoxyphenol, and p-phenoxyphenol.

The aldehyde used in the practice of this invention can be any aliphatic or aromatic aldehyde. It can be introduced to the reaction as a solid, such as a paraformaldehyde, as a liquid such as salicylaldehyde or paraldehyde, as a solution such as an alcohol, e.g., methanol or butanol, etc., or as a gas from a generator. Aqueous solutions are unsatisfactory since the presence of water is detrimental to catalyst activity. Alcoholic solutions should be avoided if the formation of the oxidized species is preferred. If an alcoholic aldehyde solution is used, then butanol is the preferred solvent.

The catalysts suitable for the practice of this invention are the organic derivatives of aluminum, zirconium and titanium. The preferred organic derivatives are the alkoxides, alkyls and carboxylate salts. The alkyl and alkoxy groups are generally of from 1 to 10 carbon atoms and the carboxylate is generally of 1 to 20 carbon atoms.

Of the aluminum compounds, the preferred compounds are triethyl aluminum and aluminum isopropoxide. Of the carboxylate aluminum salts, the oleate is a preferred catalyst.

The preferred organic titanates include but are not limited to tetra-alkyl substituted titanates, e.g. tetrakis-ethylhexyl titanate, tetraphenyl titanate, tetrabutyl titanate and tetraisopropyl titanate; tetrakis-ethylhexyl titanate is a preferred catalyst. Other organic titanates include titanate salts of carboxylic acids of from 1 to 20 carbon atoms, e.g. titanium oleate and titanium naphthenate.

Of the zirconium compounds, the alkoxides are preferred, especially zirconium isopropoxide.

The amount of catalyst to be used varies somewhat according to the catalyst. In general, an amount sufficient to provide from about 100 to about 5000 ppm or more based on the phenol content, of aluminum, titanium or zirconium ion. About 3000 ppm is generally preferred.

It is an embodiment of this invention to modify the phenolaldehyde reaction end product with from 1–20% of a third component or mixture thereof which can include natural polymers such as soy protein; polyhydric compounds such as cellulosics and starches; polyols such as glycols or polyglycols, polyvinyl alcohol, and erythritols; amines such as aniline, substituted aniline and polyamines such as hexamethylenediamine; amides such as ureas, polyamides, polyacrylamides, urethanes, polyurethanes; and monohydric alcohols such as furfuryl alcohol. The third component can also be additional or different aldehydes or phenols and can be included with the other reactants at the beginning of the process or at any stage during the reaction period or the third component can be added to the finished resin.

Adhesion promoters can also be incorporated into the resin to modify resin structure as well as performance properties. Examples would include functional silanes. It is another embodiment of this invention to react the finished resin with alkanols of 1–5 carbon atoms, preferably butanol, to provide etherified products, or to react the finished resin with acylating agents, preferably acetic anhydride, to provide esterified products. Such reactions are well known in the art. Alternatively, the reaction can be conducted in situ since the conjugate alcohol of the aldehyde is present as a byproduct of the reaction. The establishment and conduct of such reactions are well known to those skilled in the art.

For cold box applications, the resin is mixed with a foundry aggregate, e.g. sand, in an amount of about 0.5 to 5.0%, preferably about 0.5 to 1.0% based on sand. Then a reactive prepolymer 0.5 to 1.0% based on sand is added to the sand-resin mixture which is then delivered to a mold or a core box. A gaseous catalyst such as phosphine or $BF_3$ and complexes is then passed through the sand mixture which results in chemically curing the resin. Strong base amine catalysts known in the art can also be used.

In no-bake applications, about 0.1 to 2.0% (based on total binder) catalyst is mixed with the resin portion and this mixture is then mixed with the aggregate. The reactive prepolymer is then added and after thorough mixing, the coated sand is delivered to a molding box or core box. Within minutes the reactive prepolymer and the resin react and cure, and the mold or core can be removed from the box. The catalysts used in the practice of this invention include organo-phosphine derivatives of which triphenylphosphine is preferred. Combinations of these with metal driers, such as lead naphthenate are also effective. Amine bases can also be used in the practice of this invention. Those with $pK_b$ from 4 to 7 are preferred, e.g. N-ethylmorpholine and dimethylbenzylamine. These catalysts can also be used with other known catalyst, e.g. naphthenates of lead, tin, cobalt and the like. Amine catalysts known in the art can also be used.

Reactive prepolymers are well-known in the art and do not form a part of this invention. Examples of such prepolymers include polyisocyanates and epoxy resins. Any of the reactive prepolymers known in the art can be used in the practice of this invention.

The invention will be better understood with reference to the following examples. It is understood, however, that the examples are intended only to illustrate the invention and it is not intended that they limit the invention.

EXAMPLE 1

Phenol 376 g (4 moles) was heated to 50° C. to liquify it and was charged to a reaction vessel equipped with a stirrer and reflux condenser. The phenol was further heated to 80° C. and 91% paraformaldehyde 171 g (5.2 moles) was added. After the temperature reached 90° C., tetrakis-ethylhexyl titanate 13.3 g was added, thus providing a titanium ion catalyst concentration of 3000 ppm based on the phenol content. The reaction mixture was then heated to 115°–120° C. and held under reflux for about 90 minutes or until the cloud point was 57–60% at a refractive index of 1.56–1.59.

At this point, a water trap was put into place to collect the water of reaction. The reaction, which had cooled somewhat, was reheated to 115°–120° C., and held under distillation for about one hour until the cloud point reached 47–50% at a refractive index of 1.59–1.60. Approximately 50 ml of distillate was recovered and the resin had a viscosity (Cone and Plate at 75° C.) of 100 to 130 cps.

Heat was removed from the reactor and the system was placed under full vacuum for about 30 minutes to remove residual water of reaction. Approximately 20 ml of additional distillate was recovered. The temperature of the vacuum strip was held within 75°–80° C. to minimize further advancement of the resin. The properties of the resin are given in Table 1. The distillate composite contained approximately 10% methanol.

A. Using the resin prepared as above, a typical no-bake resin solution was prepared by dissolving the resin in the following polar-nonpolar solvent system:

| No-Bake Resin Formulation | |
|---|---|
| Resin | 60 parts |
| 2-Butoxyethyl acetate | 15 parts |
| Aromatic Solvent | 25 parts |

To 12 g of this resin formulation was added 0.125 g of N-ethylmorpholine as a 25% wt solution in aromatic solvent and this mixture was mixed well with 1600 g clean silica sand. Then 12 g of an 80% solution of a polyisocyanate prepolymer in aromatic solvent (Mondur MR, marketed by Mobay Chemical Corporation, Pittsburgh, Pennsylvania) was added, mixed rapidly, and placed in a mold. After a latent period, the resin hardened. The course of the set was monitored by a Dietert probe to a core strength of 50 psi at which time the core was stripped from the mold. In a second experiment, 0.25 g of N-ethylmorpholine was used in place of 0.125 g. Core tensile strengths as a function of time are shown in Table 2.

B. The experiment described in the foregoing paragraph A was repeated in all essential details except that triphenyl phosphine (25% wt in 2-butoxyethyl acetate) was substituted for N-ethylmorpholine. The results are given in Table 2.

TABLE 1

| | Properties of Resins | |
|---|---|---|
| Resin Properties | Example 1 | Example 2 |
| Free formaldehyde, % | 3.5 | 5 |
| Free phenol, % | 6 | 12 |
| Water, % | <1.0 | <1.0 |
| Cloud point, % | 45 | 49 |
| Neat viscosity (75° C.) cps | 420 | 210 |

TABLE 2

| Catalyst (total binder) | Cure Time | | Tensile Strength (psi) | | | |
|---|---|---|---|---|---|---|
| | | | 0.5 hrs | 1.0 hrs | 2.0 hrs | ON* |
| N-ethylmorpholine (0.125 g) | latent cured | 3–8 min 12 min | 150 | 125 | 270 | 220 |
| N-ethylmorpholine (0.25 g) | latent cured | 0–4 min 6 min | 123 | 160 | 200 | 230 |
| Triphenylphosphine (0.125 g) | latent cured | 0–7 min 11 min | 97 | — | — | 167 |
| Triphenylphosphine (0.25 g) | latent cured | 0–2 min 5 min | 130 | — | — | 160 |

*ON = overnight

EXAMPLE 2

Phenol 376 g (4 moles) was heated to 50° C. to liquify it and was then charged to a reaction vessel equipped with a reflux condenser and stirrer. The phenol was further heated to 80° C. and 91% paraformaldehyde 198 g (6 moles) was added. After the temperature reached 90° C., tetrakis-ethylhexyl titanate 13.3 g was added, thus providing a titanium ion catalyst concentration of 3000 ppm based on the phenol content. The reaction mixture was then heated to 115°–120° C. until the cloud point measurement was 50–52% at a refractive index of 1.58–1.59. The heat was then removed and a vacuum was applied for 90 minutes while holding the temperature at 75° C. About 50–60 ml of distillate (ca 10% methanol) was recovered during this period. The properties of the resin are given in Table 1.

EXAMPLE 3

The resin of Example 1 was evaluated in the following typical cold-box formulation.

| Cold Box Resin Formulation | |
|---|---|
| Resin | 50 parts |
| Diisobutyl phthalate | 30 parts |
| Aromatic solvent* | 15 parts |
| Kerosene | 4 parts |
| Oleic acid | 1 part |
| | 100 parts |

*Panasol An-3, marketed by Amoco Chemical Corporation was used.

Twelve grams (12 g) of this resin solution was thoroughly mixed with 1600 g washed silica sand. To this mixture was added 12 g of an 80% solution of polyisocyanate prepolymer (Mondur MR). The total binder component was 1.5% based on sand.

The sand-binder mixture was delivered to a mold box and triethylamine gas was passed through the box to cure the sand cores. The samples obtained showed good tensile strengths as a function of time. The pot-life of the sand-binder mixture also was acceptable. Typical results are shown in Table 3.

TABLE 3
Properties of Cold-Box Core Samples

| I. Tensile Strength: | Core samples prepared and broken as function of time | | | | | |
|---|---|---|---|---|---|---|
| Core Age (hrs) | 0 | ½ | 1.0 | 2.0 | 4 | ON |
| Tensile (psi) | 110 | 160 | 170 | 200 | 240 | 280 |
| II. Pot Life: | Sand-binder mixture aged and cores made at time intervals | | | | | |
| Pot Life (hrs) | — | 1.0 | 2.0 | 3.0 | 4.0 | |
| Tensile (psi) | 110 | 150 | 130 | 110 | 75 | |

EXAMPLE 4

The experiment of Example 1 was repeated in all essential details except that urea, 5% based on the phenol, was included in the phenol-formaldehyde reaction mixture. The resin thereby obtained was useful in cold-box and no-bake applications.

EXAMPLES 5-7

The experiment of Example 4 was repeated in all essential details except that the following modifying compounds were substituted for urea. The resins thereby obtained were useful in cold-box and no-bake applications.

| Example | Modifier |
|---|---|
| 5 | Soy protein (pro-cote products of Ralston Purina) |
| 6 | Aniline |
| 7 | Furfuryl alcohol |

EXAMPLES 8-13

The experiment of Example 4 is repeated in all essential details except that the following modifying compounds are substituted for urea. The resins thereby obtained are useful in cold-box and no-bake applications.

| Example | Modifier |
|---|---|
| 8 | Starch |
| 9 | Ethylene glycol |
| 10 | Polyvinyl alcohol |
| 11 | Pentaerythritol |
| 12 | Hexamethylenetetramine |
| 13 | Polyacrylamide |

EXAMPLES 14-17

The experiment of Example 1 was repeated in all essential details except that the following catalysts were substituted for tetrakis-ethylhexyl titanate. The resins thereby obtained were useful in cold-box and no-bake applications.

| Example | Modifier |
|---|---|
| 14 | Zirconium isopropoxide |
| 15 | Aluminum isopropoxide |
| 16 | Tetrabutyl titanate |
| 17 | Tetraisopropyl titanate |

EXAMPLES 18-21

The experiment of Example 1 is repeated in all essential details except that the following catalysts are substituted for tetrakis-ethylhexyl titanate. The resulting resins are useful in cold-box and no-bake applications.

| Example | Modifier |
|---|---|
| 18 | Titanium laureate naphthenate |
| 19 | Titanium oleate |
| 20 | Titanium naphthenate |
| 21 | Triethylaluminum |

Determination of Cloud Point

Cloud point measurements are well known in the art and are commonly employed to indicate the degree of polymerization of a resin. In general, the procedure involves dissolving a weighed amount of resin in a weighed amount of solvent and titrating with a non-solvent until a cloud appears in the mixture. The cloud point is that number obtained by dividing the weight of the non-solvent by the sum of the weights of the non-solvent, the solvent and the resin. This number is multiplied by 100 and is expressed as a percentage. The term cloud point as used herein is intended to mean that percentage obtained by dissolving one gram of resin in 99 g of tetrahydrofuran (the solvent) and titrating with water.

We claim:

1. A resin prepolymer obtained by a process comprising the steps of reacting a phenol and an aldehyde in a mole ratio of from 1 to 1-2.3 at a temperature of from 100° C. to 130° C. in the presence of catalytic amounts of organic derivatives of titanium, ziconium or alkyl and alkoxide derivatives of aluminum.

2. The resin of claim 1 wherein the catalyst is present in amount of about 100 to 5000 ppm of metal ion based on the phenol content.

3. The resin of claim 2 wherein the catalyst is a tetrasubstituted alkyl titanate, each alkyl group having from 1 to 10 carbon atoms.

4. The resin of claim 3 wherein the alkyl titanate is tetrakis-ethylhexyl titanate.

5. The resin of claim 3 wherein the alkyl titanate is tetra-isopropyl titanate.

6. The resin of claim 3 wherein the alkyl titanate is tetrabutyl titanate.

7. The resin of claim 2 wherein the catalyst is a trialkyl-aluminum compound, each alkyl having from 1 to 10 carbon atoms, or a trialkoxide aluminum compound, each alkoxide group having from 1 to 10 carbon atoms.

8. The resin of claim 7 wherein the catalyst is aluminum isopropoxide.

9. The resin of claim 2 wherein the catalyst is a tetraalkyl substituted organo zirconium compounds, each alkyl group having from 1 to 10 carbon atoms.

10. The resin of claim 9 wherein the catalyst is zirconium isopropoxide.

11. The resin of claim 2 wherein the catalyst is a titanium salt of an alkyl or aryl carboxylic acid of from 1 to 20 carbon atoms.

12. The resin of claim 1 wherein the phenol is an unsubstituted phenol and the aldehyde is formaldehyde.

13. The resin of claim 1 wherein the phenol is an unsubstituted phenol and the aldehyde is salicylaldehyde.

14. The resin of claim 1 modified by conducting the reaction of phenol and formaldehyde in the presence of a modifier selected from the group consisting of natural polymers, polyols, amines, amides, or monohydric alcohols.

15. The resin of claim 14 wherein the modifier is present in an amount of from 1 to 20%.

16. The resin of claim 14 wherein the modifier is urea.

17. The resin of claim 14 wherein the natural polymer modifier is an alkaline treated soy protein.

18. The resin of claim 14 wherein the amine modifier is aniline.

19. The resin of claim 14 wherein the monohydric alcohol modifier is furfuryl alcohol.

20. An organic solvent soluble resin prepolymer characterized by a cloud point of 45 to 50%, and a neat viscosity of 200-1000 cps at 75° C. in which a prepolymer wherein the benzylic ether and methylene bridges are present in a ratio of about 1:5 obtained by the process comprising the steps of reacting phenol and formaldehyde in a mole ratio of about 1 to 1-2.3 in the presence of catalytic amounts of organic derivatives of titanium or zirconium or alkyl and alkoxide derivatives of aluminum at a temperature of up to about 120° C., for a period of time sufficient to provide a cloud point of 40 to 60% thereby forming water and methanol, separating a major portion of the water and methanol by distillation at 115°-120° C. for a period of time sufficient to provide a cloud point of 47-50% and viscosity of 100-130 centipoise at 75° C. and separating residual water and methanol at reduced pressure at about 80° C. or less thereby producing a prepolymer having a cloud point of about 45-50% and a neat viscosity of 200-1000 centipoise at 75° C.

21. The resin of claim 1 modified by reacting the resin with an alkanol of 1-5 carbon atoms or an acylating agent.

22. The resin of claim 14 wherein the amine modifier further includes substituted derivatives of aniline.

23. The resin of claim 14 wherein the polyol modifier includes polyhydric compounds.

* * * * *